United States Patent [19]

Lozano

[11] Patent Number: 5,613,725
[45] Date of Patent: Mar. 25, 1997

[54] GLARE SHIELD DEVICE

[76] Inventor: Robert G. Lozano, 3346 Gail Ct., Stockton, Calif. 95206

[21] Appl. No.: 381,743

[22] Filed: Feb. 1, 1995

[51] Int. Cl.$^6$ .................................................. B60J 3/02
[52] U.S. Cl. ............................................................ 296/97.6
[58] Field of Search ........................................... 296/97.6

[56] References Cited

U.S. PATENT DOCUMENTS

| | | | |
|---|---|---|---|
| 2,458,125 | 1/1949 | Winkler | 296/97.6 X |
| 2,528,038 | 10/1950 | Crise | 359/614 |
| 2,833,591 | 5/1958 | Kurtzke | 296/97.6 |
| 3,304,118 | 2/1967 | Jonas | 296/97.6 |
| 3,534,999 | 10/1970 | Kesselring | 296/97.6 |
| 3,837,703 | 9/1974 | Holladay | 296/97.6 |
| 4,167,287 | 9/1979 | Franklin et al. | 296/97.6 |
| 4,352,519 | 10/1982 | Aro | 296/97.6 |
| 4,635,995 | 6/1987 | Mineck | 296/97.6 |
| 4,982,992 | 1/1991 | Vu et al. | 296/97.6 |
| 5,249,835 | 10/1993 | Emoto | 296/97.6 |
| 5,356,192 | 10/1994 | Schierau | 296/97.6 |
| 5,427,427 | 6/1995 | Holter | 296/97.6 |

FOREIGN PATENT DOCUMENTS

| | | | |
|---|---|---|---|
| 1132147 | 3/1957 | France | 296/97.6 |
| 2310894 | 12/1976 | France | 296/97.6 |
| 575011 | 3/1957 | Italy | 296/97.6 |

*Primary Examiner*—Andrew C. Pike
*Attorney, Agent, or Firm*—John P. Costello

[57] ABSTRACT

A glare shield device for attaching to an automobile sun visor includes a glare shield rotatably coupled to a stabilizer, in a parallel relation. The glare shield is tinted and may extend beyond the ends of a typical sun visor for purposes of reducing glare and increasing visibility throughout a wide range of viewing. The stabilizer and glare shield are coupled so that a gap remains between them, this gap allowing the glare shield a significant range of motion, thereby allowing numerous adjustment positions for through-viewing by drivers of differing heights.

1 Claim, 2 Drawing Sheets

GLARE SHIELD DEVICE

BACKGROUND OF THE INVENTION

1. Field of the Invention

This invention pertains generally to the field of glare shielding and, more particularly, to an automotive device mountable in a driver's line of sight, for purposes of reducing glare and distortion caused by bright light sources, fog, and rain.

2. Description of the Background Art

Various devices have been developed for automobiles which reduce glare and increase visibility in fog or rain. Many of these devices are mountable upon an automobile sun visor for ready positioning within a driver's line of sight. For example, U.S. Pat. No. 4,635,995, issued to Mineck, discloses an attachment for a sun visor having a glare shield molded integrally to a spring clip, wherein upon attaching to a sun visor, the glare shield is held in a stationary position and is incapable of adjustment. A problem arises when a driver tilts the visor forward, or backward, to elevate the lower edge of the visor to accommodate his height, as the body of the glare shield also tilts in the plane of the sun visor, and cannot be adjusted to a more desirable vertical position.

Numerous other glare shield devices, instead of being stationary, have incorporated a rotatable feature, to allow the body of the glare shield to be adjusted in a vertical plane. The normal method of adjustment in these devices is to first rotate the sun visor to a height approximating the driver's line of sight, and subsequently rotate the glare shield to a substantially vertical orientation, for through-viewing. An example of this is seen in U.S. Pat. No. 3,837,703 issued to Holladay, which discloses a glare shield coupled to two rotatable members near the top of one of its faces, the rotatable members in turn being coupled to two spring clips oriented in a 90-degree relation to the face of the glare shield. This arrangement allows the glare shield to be rotated through an arc approximating 180 degrees, but because of the odd positioning of the rotatable members on the face of the glare shield, the glare shield cannot be easily adjusted for through-viewing by a driver.

A wider range of useful positionings of the glare shield are achievable if the rotating member is located at the top of, rather than upon the face of, the glare shield. Such a positioning of the rotatable member is disclosed in U.S. Pat. No. 2,528,038, issued to Crise; U.S. Pat. No. 3,534,999, issued to Kesselring; U.S. Pat. No. 4,167,287, issued to Franklin et al.; U.S. Pat. No. 4,352,519, issued to Aro; and U.S. Pat. No. 3,304,118 issued to Jonas. By positioning the rotatable members at the top of, rather than upon the face of, the glare shield, the glare shield pivots easily into a substantially vertical position useful for through-viewing by a driver. In this arrangement, the glare shield can be moved easily into various positions throughout a 180-degree arc, for accommodating the height and line of sight of different drivers.

The 180-degree arc traveled by the glare shield of these devices is measured at a point of zero degrees, when the glare shield is lying flat against the sun visor, to a point of 180 degrees, where the glare shield typically "bottoms out" by abutting against the sun visor at its top edge, thereby preventing further vertical rotation.

By not being able to rotate further, these prior art devices prevent rotation of the glare shield into a substantial area of space in front of the driver. By being unable to rotate the glare shield into this additional area, the driver is denied a substantial range of adjustment. The only way to take advantage of this additional space with the present devices is to remove them, flip them over, and re-attach the devices to the sun visor in the opposite position. Upon re-attachment, these devices can then be swung vertically throughout the remainder of the 360-degree range of possible motion. However, flipping these devices over and re-attaching them is time consuming and burdensome.

Another problem unsolved in the art has been the propensity for the prior art devices employing a single, open-ended clip fastener of the type shown in Franklin et al., to wobble from side to side, and shake loose, during travel over rough road surfaces. Traditionally, this stability problem has been solved by adding more than one clip fastener as seen in U.S. Pat. No. 2,458,125 issued to Winkler, U.S. Pat. No. 4,982,992 issued to Vu et al., and French Pat. No. 2,310,894 issued to Durelle. However, by adding more than one clip fastener, the process of coupling a glare shield device upon a sun visor becomes more difficult, as the simplicity of a one-clip device is lost. Other methods of solving the stability problem include using brackets and other mechanically complex means of fastening a glare shield device to a sun visor, as is seen in U.S. Pat. No. 5,356,192 issued to Schierau, U.S. Pat. No. 5,249,835 issued to Emoto, U.S. Pat. No. 5,427,427 issued to Holter, Italian Pat. No. 575011 issued to Zaccagnini, and French Pat. No. 1,132,147 issued to LaFont.

Additionally, a glare shield device has not been devised which provides glare protection for areas beyond a driver's direct line of sight. The prior art devices are often too short in length to cover areas directly to the left, or right, of a driver's line of sight.

Therefore, a need still exists for a glare shield device for an automobile which allows a driver to adjust the glare shield throughout a greater range of motion than devices which are presently available, which presents a single clip fastener design capable of being stable under all road conditions, and which additionally provides glare protection throughout a wide range of viewing. By allowing a greater range of motion, a greater range of adjustment is likewise achieved, and a greater number of drivers of differing heights can be accommodated.

The foregoing patents reflect the state of the art of which the inventor is aware and are tendered with a view toward discharging inventor's acknowledged duty of candor in disclosing information which may be pertinent to the examination of this application. It is respectfully stipulated, however, that none of these patents teach or render obvious, singly or when considered in combination, inventor's claimed invention.

SUMMARY OF THE INVENTION

The present invention generally pertains to an automobile glare shield device for reducing glare caused by sunlight, and oncoming headlights, as well as for increasing visibility in fog or rain. This glare shield device attaches to an automobile sun visor and is adjustable throughout a wider range of motion than prior art devices heretofore developed.

In accordance with one aspect of the invention, a substantially oblong, tinted, glare shield, comprised of optical quality glass, or plastic, is rotatably coupled in a parallel relation to a substantially oblong stabilizer, by one or more hinge mechanisms. The stabilizer has top and bottom edges, and front and rear faces. When in place upon an automobile visor, the front face of the stabilizer is turned in the direction of the windshield and the rear face is positioned backward, towards the driver. The stabilizer is coupled additionally to a single clip fastener, preferably on its rear face, the bottom of the clip fastener being approximate in height to, and parallel with, the bottom edge of the stabilizer. By positioning the clip fastener in such a manner, the bottom edge of an automobile sun visor, upon entering the clip fastener and contacting its inside bottom edge, will be even in height with, and parallel to, the bottom of the clip fastener and the bottom edge of the stabilizer.

In accordance with another aspect of the invention, it is preferable that the glare shield and stabilizer be separated by a gap. This gap assures that the glare shield will hang below the sun visor, and not abut against it, throughout a significant range of rotation. By being nearly free of interference from the sun visor, the glare shield of this device achieves a wider range of movement than seen in prior art devices.

Also in accordance with the invention, the hinge mechanism employed preferably includes a friction-type hinge, which allows enough play for the average driver to adjust easily, but once at a desired position, holds the glare shield in place.

In accordance with another aspect of the invention, the glare shield is of a horizontal width greater than the stabilizer and greater than the horizontal width of the average sun visor, so as to give a driver significant peripheral viewing beyond his direct line of sight. The wide design of the glare shield allows a driver to enjoy protection from bright lights and increased visibility in fog or rain, upon looking to the left, right, or straight ahead.

It is an object of this invention to provide a glare shield device capable of movement throughout a significant range of motion, without having to be removed from a sun visor, flipped over, and repositioned for use.

It is another object of this invention to provide a glare shield device that allows a driver to be protected from bright lights and enjoy increased vision in fog or rain throughout a broad range of vision.

Another object of this invention is to provide a glare shield device which incorporates a single clip fastener, yet remains stable upon a sun visor during travel over rough road surfaces.

Still other objects and advantages of the glare shield device described herein will become readily apparent to those skilled in this art from the following detailed description, wherein only the preferred embodiments of this device have been shown and described, simply by way of illustration of the best mode contemplated of carrying out the invention. As will be realized, the glare shield device is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
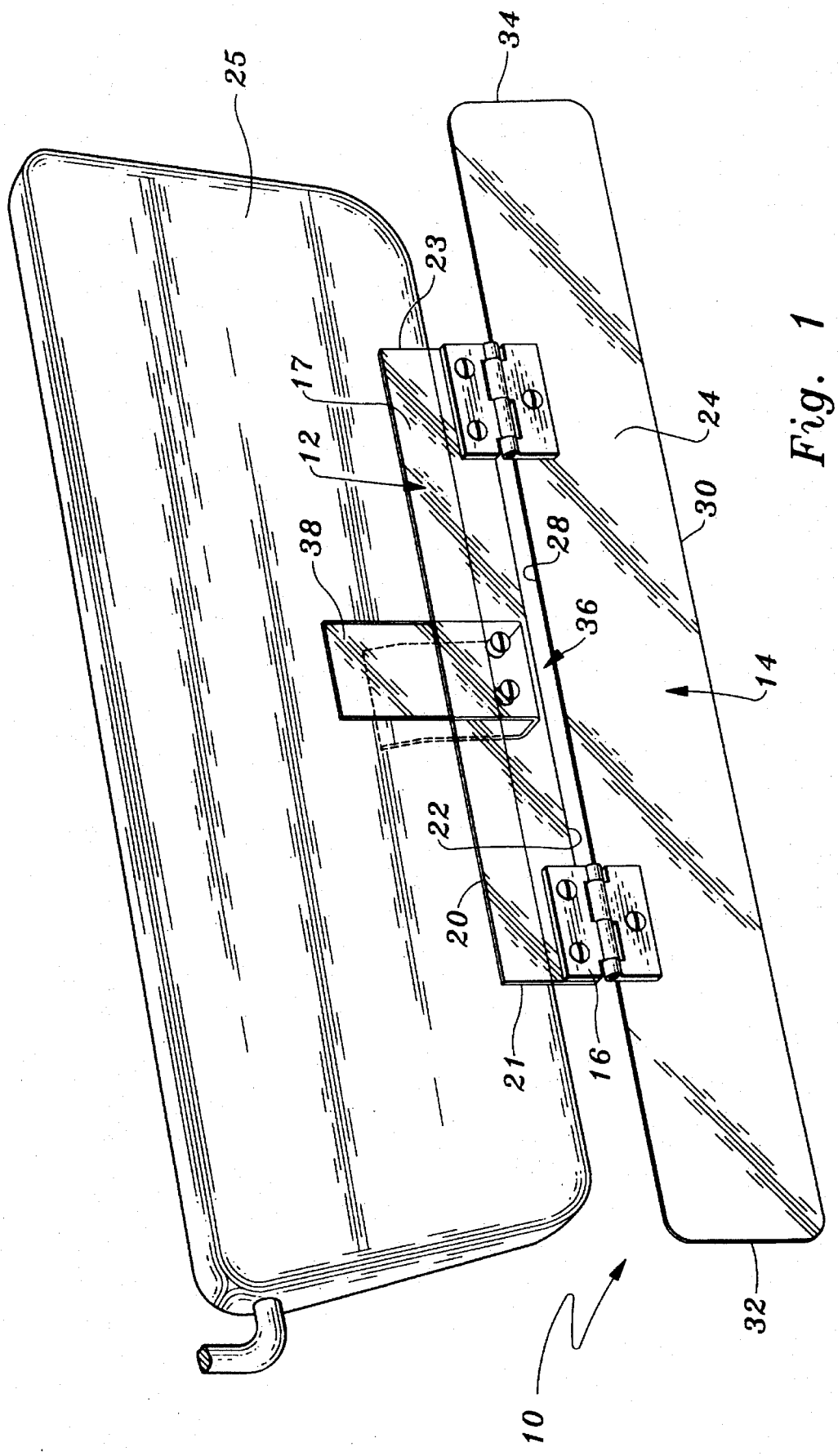
FIG. 1 is a perspective view of the glare shield device of the present invention coupled to an automobile sun visor.

Referring more specifically to the drawings, the present invention is shown in FIG. 1. The glare shield device 10 includes a stabilizer 12 coupled to a glare shield 14 by one or more rotatable hinge mechanisms 16. Glare shield 14 is preferably constructed of tinted, optical quality glass or plastic, and may additionally have qualities useful for protection from ultraviolet rays.

Figure 2:
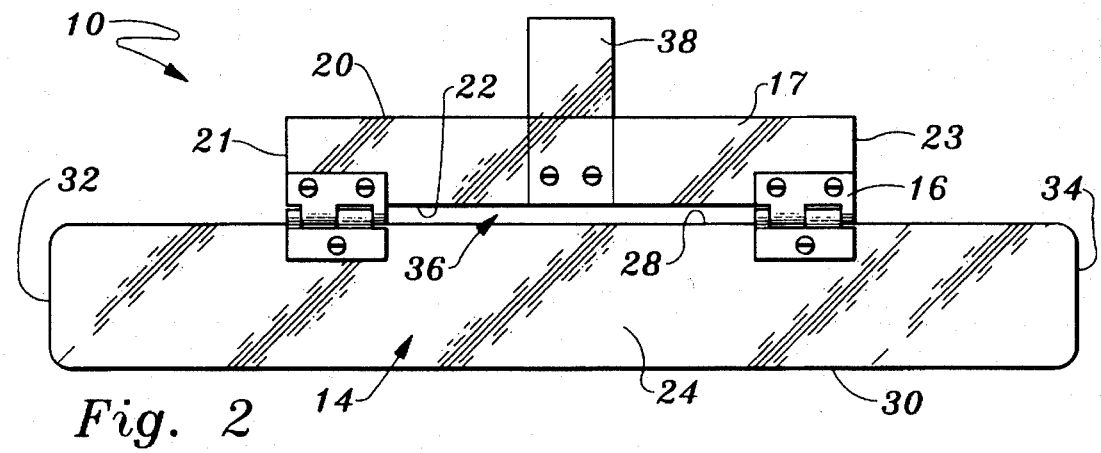
FIG. 2 is a front view of the glare shield device shown in FIG. 1.
Figure 3:
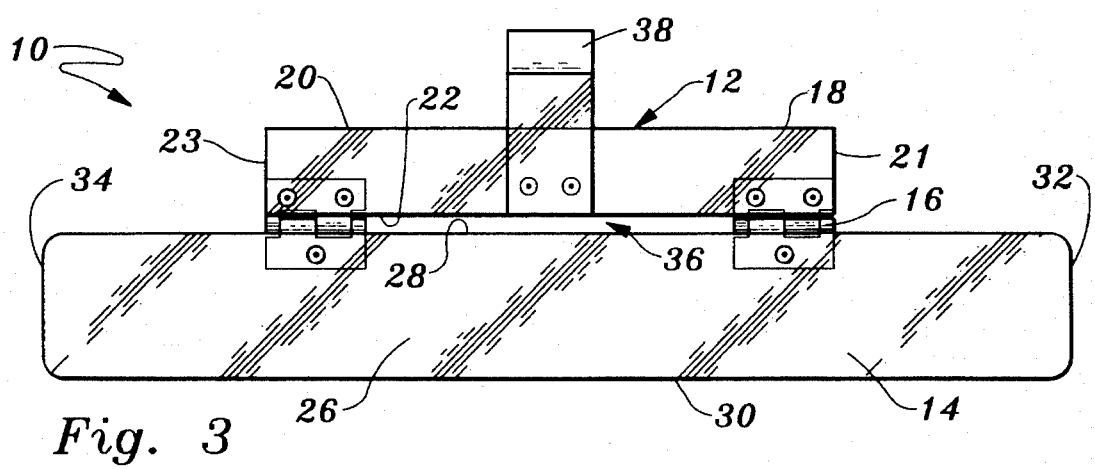
FIG. 3 is a rear view of the glare shield device shown in FIG. 1.
Figure 4:
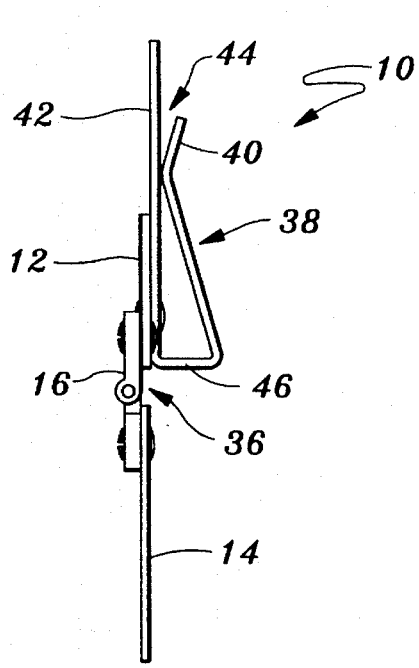
FIG. 4 is a side view of the glare shield device shown in FIG. 1.

Referring also to FIGS. 2, 3, and 4, it can be seen that rectangular stabilizer 12 is substantially oblong with a front face 17, a rear face 18, a top edge 20, a bottom edge 22, a first end 21, and a second end 23. The oblong shape of stabilizer 12 allows for significant contact with the surface of an automobile sun visor 25, thereby lending a stable, solid feel to device 10, upon attaching to sun visor 25. Likewise, glare shield 14 is substantially oblong with a front face 24, a rear face 26, a top edge 28, and a bottom edge 30. Ends 32, 34 of glare shield 14 preferably extend a substantial distance beyond ends 21, 23, of stabilizer 12, which is positioned above and parallel to glare shield 14. Additionally, as shown in FIG. 1, ends 32, 34 of glare shield 14 also preferably extend beyond the ends of the average automobile visor 25, for perhaps one to four inches, for allowing a driver to enjoy protection from bright light sources and increased visibility, whether he is looking to the left, right, or straight ahead. Although not shown, it is also contemplated that ends 32, 34 could be of differing lengths, if it is found that drivers require an extended view of one side, versus the other.

Figure 5:
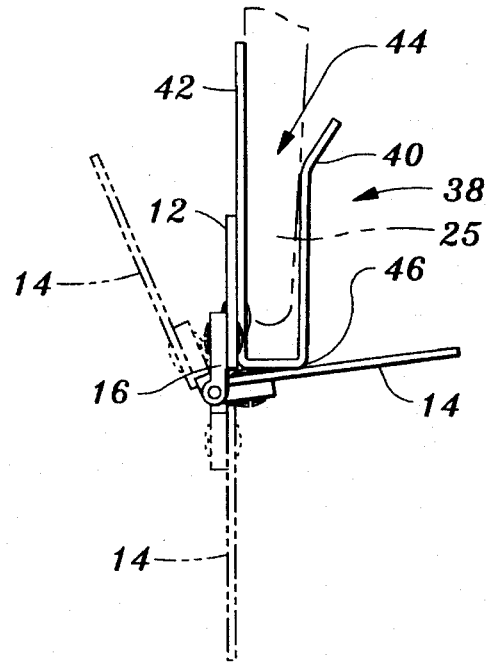
FIG. 5 is a side view of the glare shield device of the present invention shown attached to an automobile sun visor, illustrating the wide range of motion achievable by the invention.

Hinge mechanisms 16 are preferably of a friction type which are capable of being rotated into a preferred position by a driver, and remaining there. Additionally, it is preferred that hinge mechanisms 16 couple stabilizer 12 to glare shield 14 in such a manner that a gap 36 is created. By separating stabilizer 12 from glare shield 14 with gap 36, glare shield 14 achieves an extremely wide range of motion as seen in FIG. 5. Gap 36 allows glare shield 14 to travel in an arc approximating 270 degrees, in relation to stabilizer 12, which allows for a sufficient number of adjustment positions, for accommodating the height and line of sight requirements of most drivers.

Referring still to FIGS. 4 and 5, it can be seen how hinge mechanism 16 couples upon stabilizer 12 and glare shield 14. Additionally, a clip fastener 38 is illustrated for attaching device 10 to automobile visor 25. Clip fastener 38 is positioned menially upon stabilizer 12 for purposes of lending balance to device 10 upon being placed upon visor 25. Clip fastener 38 has a top member 40, a bottom member 42, an open end 44 for receiving automobile sun visor 25, and a closed end 46, upon which the bottom edge of sun visor 25 contacts at its most extreme position. Top member 40 preferably angles away from bottom member 42 at its uppermost portion, for purposes of easily receiving sun visor 25 placed between top and bottom members 40, 42. Bottom member 42 is preferably of sufficiently greater length than top member 40, for allowing clip fastener 38 to achieve superior purchase upon sun visor 25. Device 10 is specifically designed to allow a single, open ended clip fastener 38 to be sufficient for retaining device 10 upon sun visor 25. Superior retention of device 10 is achievable with a single clip fastener 38 by positioning closed end 46 even with, and parallel to, bottom edge 22 of stabilizer 12. This positioning of clip fastener 38 upon stabilizer 12 allows the top edge 20 of stabilizer 12 to slide significantly above the bottom edge of sun visor 25. Once device 10 is in position upon sun visor 25, closed end 46 and bottom edge 22 are even with and parallel to bottom edge of sun visor 25 and the body of stabilizer 12 achieves significant purchase upon sun visor 25. By achieving purchase upon sun visor 25, stabilizer 12 aids clip fastener 38 in retaining device 10 upon sun visor 25. Additionally, the positioning of stabilizer 12 upon sun visor 25 helps avoid problems related to device 10 shaking and wobbling from side to side, as a vehicle travels over rough surfaces.

Accordingly, it will be seen that this invention provides for a glare shield device capable of a wide range of motion for accommodating the height and line of sight requirements of numerous drivers. This device is additionally of a sufficient length for allowing a driver to be protected from glare through a wide range of viewing, whether he is looking to the left, right, or straight ahead.

Although the description above contains many specificities, these should not be construed as limiting the scope of the invention, but as merely providing illustrations of some of the presently preferred embodiments of this invention. Thus the scope of this invention should be determined by the appended claims and their legal equivalents.

I claim:

1. A device for coupling above a bottom edge of an automobile sun visor, the device functioning to increase a driver's visibility, the device comprising:

(a) a glare shield, said glare shield having a first end, and a second end, a top edge, and a bottom edge;

(b) an oblong rectangular stabilizer having a first end, a second end, a top edge, and a bottom edge;

(c) said first and second ends of said glare shield extending a substantial distance beyond said first and second ends of said stabilizer;

(d) a pair of hinges coupled to said first and second ends of said stabilizer, said hinges further being coupled below said stabilizer to said glare shield, said hinges being coupled to said stabilizer and said glare shield creating a gap between said stabilizer and said glare shield, said hinges rotatably coupling said glare shield and said stabilizer in a parallel relation to each other, said gap allowing said glare shield to rotate on said hinges in an arc approximating 270 degrees in relation to said stabilizer; and (e) a single clip fastener, said clip fastener being positioned medially upon said stabilizer;

(f) said clip fastener having a first bottom member, a second top member, a closed end extending between said top and bottom members, and an open end for receiving said bottom edge of said sun visor;

(g) said bottom member being of greater length than said top member (h) said top member having a bend at an uppermost portion thereof, said bend causing said uppermost portion to angle away from said bottom member;

(i) said top edge of said stabilizer perpendicularly crossing said bottom member at a midpoint of said bottom member, said bottom member coupling to said stabilizer;

(j) said closed end being positioned upon said stabilizer substantially even with, and parallel to, said bottom edge of said stabilizer, said closed end being positioned upon said stabilizer allowing said top edge of said stabilizer to be positioned significantly above said bottom edge of said sun visor.

* * * * *